(12) United States Patent
Li et al.

(10) Patent No.: US 12,417,587 B2
(45) Date of Patent: Sep. 16, 2025

(54) PRESENTATION OF REPRESENTATION OF DEVICE IN VIRTUAL SPACE BASED ON LIVE PHYSICAL ATTRIBUTE(S)

(71) Applicant: Lenovo (Singapore) Pte, Ltd., Singapore (SG)

(72) Inventors: Scott Li, Cary, NC (US); Igor Stolbikov, Cary, NC (US); Chunling Han, Morrisville, NC (US); Christian de Hoyos, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 427 days.

(21) Appl. No.: 17/815,943

(22) Filed: Jul. 28, 2022

(65) Prior Publication Data

US 2024/0037860 A1 Feb. 1, 2024

(51) Int. Cl.
| | |
|---|---|
| *G06T 19/00* | (2011.01) |
| *G06F 3/01* | (2006.01) |
| *G06F 3/04815* | (2022.01) |
| *G06T 19/20* | (2011.01) |

(52) U.S. Cl.
CPC ............ *G06T 19/006* (2013.01); *G06F 3/011* (2013.01); *G06F 3/04815* (2013.01); *G06T 19/20* (2013.01); *G06T 2219/2004* (2013.01)

(58) Field of Classification Search
CPC .................. G06T 19/006; G06T 19/20; G06T 2219/2004; G06F 3/011; G06F 3/04815; G06F 1/1616; G06F 1/1618; G06F 1/163; G06F 1/1686; G06F 1/1694; G06F 3/013; G06F 3/012

See application file for complete search history.

(56) References Cited

U.S. PATENT DOCUMENTS

| | | | |
|---|---|---|---|
| 2013/0063477 A1* | 3/2013 | Richardson | G06F 3/012 345/619 |
| 2014/0035819 A1* | 2/2014 | Griffin | G06F 3/0238 345/168 |
| 2014/0333713 A1* | 11/2014 | Shoemake | H04M 7/0045 348/14.05 |
| 2015/0309705 A1* | 10/2015 | Keeler | G06N 20/00 705/27.2 |
| 2021/0132683 A1* | 5/2021 | Herling | G02B 27/0093 |
| 2021/0333864 A1* | 10/2021 | Harvey | G06T 19/006 |
| 2022/0091722 A1* | 3/2022 | Faulkner | G06F 3/0485 |
| 2023/0214481 A1* | 7/2023 | Singh | G06F 21/44 726/26 |
| 2023/0290071 A1* | 9/2023 | Luo | G06T 7/70 |

* cited by examiner

*Primary Examiner* — Chong Wu
(74) *Attorney, Agent, or Firm* — John M. Rogitz; John L. Rogitz (57) ABSTRACT

In one aspect, an apparatus may include at least one processor and storage accessible to the at least one processor. The storage may include instructions executable by the at least one processor to identify a live physical attribute of a device, where the live physical attribute may be related to the device's orientation or another aspect of the device. The instructions may also be executable to visually present, in virtual space, a representation of the device. The representation may be presented according to the live physical attribute of the device.

20 Claims, 8 Drawing Sheets

Note

Your New VR Friend Wants Info On Your Convertible Computer. I Provided Him With Info On Where To Buy A Similar Device Of The Same Make/Model ~802

Allow Other User To Interact With Your Device (e.g. Change Keyboard LED Color, Take Pic With Convertible Camera, etc.) ? ~804

PRESENTATION OF REPRESENTATION OF DEVICE IN VIRTUAL SPACE BASED ON LIVE PHYSICAL ATTRIBUTE(S)

FIELD

The disclosure below relates to technically inventive, non-routine solutions that are necessarily rooted in computer technology and that produce concrete technical improvements. In particular, the disclosure below relates to presentation of a representation of a device in virtual space based on one or more live physical attributes of the device.

BACKGROUND

As recognized herein, the ever-increasing prevalence of digital technology in our daily lives has led to a revolution in the way people work and interact with each other. For instance, users often interact with each other in virtual environments such as virtual reality (VR) worlds and the metaverse. However, the disclosure below recognizes that while these virtual environments attempt to represent real-world interactions between people for the virtual environments to feel as life-like as possible, much improvement is still needed.

SUMMARY

Accordingly, in one aspect an apparatus includes at least one processor and storage accessible to the at least one processor. The storage includes instructions executable by the at least one processor to identify a live physical attribute of a device, where the live physical attribute is related to the device's orientation. The instructions are also executable to visually present, in virtual space, a representation of the device (e.g., as a graphical object). The representation is thus presented according to the live physical attribute of the device.

In certain example implementations, the representation may be generated using metadata related to the positioning of different parts of the device with respect to each other. The metadata may even include data related to movement of different parts of the device with respect to each other. The metadata may be established at least in part by a computer aided design (CAD) file, for example. Additionally, the instructions may be executable to access the metadata at storage of a headset used to present the representation, and/or access the metadata at cloud storage accessible to the apparatus. In some examples, the apparatus may even include the headset.

Additionally, in some example embodiments the instructions may be executable to use input from a camera to identify the live physical attribute. The live physical attribute may be identified from a quick response (QR) code on the device as identified from the input, an infrared (IR) light reflector on the device as identified from the input, and/or an IR light strobe on the device as identified from the input.

In certain examples, the apparatus may even include the device itself and/or a server that generates the virtual space.

In another aspect, a method includes identifying a live physical attribute of a device and visually presenting, in virtual space, a representation of the device. The representation is presented according to the live physical attribute of the device.

In various example implementations, the live physical attribute may be identified based on Bluetooth communication with the device and/or Wi-Fi communication with the device.

Also in various examples, the live physical attribute may be related to orientation of the device in real space. Additionally or alternatively, the live physical attribute may be related to a lighting condition of one or more light emitting diodes (LEDs) on a keyboard of the device. As another example, the live physical attribute may be a real keypress of a real key on a real keyboard of the device, and the representation may show a virtual keypress of a corresponding virtual key on a virtual keyboard of the representation of the device.

In still another aspect, at least one computer readable storage medium (CRSM) that is not a transitory signal includes instructions executable by at least one processor to visually present, in virtual space, a representation of a device. The representation is presented according to a live physical attribute of the device.

In certain examples, the instructions may be executable to identify the live physical attribute of the device using input from a camera that images the device as located in the real world.

Also in certain examples, the instructions may be executable to identity input selecting, in virtual space, the representation. Responsive to the input, the instructions may then be executable to present, in virtual space, technical specifications related to the device and/or data on where to buy a similar device.

The details of present principles, both as to their structure and operation, can best be understood in reference to the accompanying drawings, in which like reference numerals refer to like parts, and in which:

DETAILED DESCRIPTION

Among other things, the detailed description below discusses representing in virtual space the physical attributes of devices being used by a user, whether presented as part of a VR, AR, or MR experience. For example, a user might use a Lenovo Yoga laptop computer to share a desktop screen or word processing document with others in a virtual workroom meeting. The Yoga laptop may be rendered in virtual space to covey its mode (e.g., tent mode), orientation, and position relative to its user in real space. Thus, live physical attributes of the real-world device may be conveyed in virtual space.

In various examples, device/object rendering metadata may be used that includes data of floating and moving parts of the relevant device as well as the device part movement/motions themselves. For example, a CAD drawing may be used. This may be done to help the VR headset with accurate device rendering in virtual space (e.g., a Yoga laptop with different modes such as tent, tablet, and presentation mode may be captured/encompassed by the object rendering metadata).

Additionally, device/object rendering metadata can be embedded in the associated device itself, such as in its firmware/driver, which can be transmitted and stored in the separate VR device during a pairing process. Still further, device/object rendering metadata can be stored online and then downloaded to the VR device by unique identifier (UID) such as QR code on the associated device itself.

Moreover, position markers such as IR reflectors, machine readable visual identifiers like QR codes, and IR strobes can be embedded on the device itself to help the separate VR headset gauge the device's orientation and relative position for representing live physical attributes in virtual space.

Still further, device live physical attributes like parts movement (e.g., mode transition on Yoga laptop) may be transmitted to the VR headset or other VR device via a side channel such as a Bluetooth channel, Wi-Fi link, etc. Keypresses on a Bluetooth keyboard may also be represented as live physical attributes, as may keyboard LED light patterns on Legion gaming laptops and other types of computers.

If desired, device interactions in virtual space from other users can be predefined by the device or device owner so that, for example, touching the device can yield more detailed information about the device such as tech specs or where to buy the device. The device owner/user might even be notified about these interactions and may in some specific examples have to allow interaction from the other user in virtual space before the other user is able to control certain aspect of the device (e.g., taking a picture with the device's camera, changing the color pattern on the device's keyboard, etc.) since the exposed control interface can be predefined by the user.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
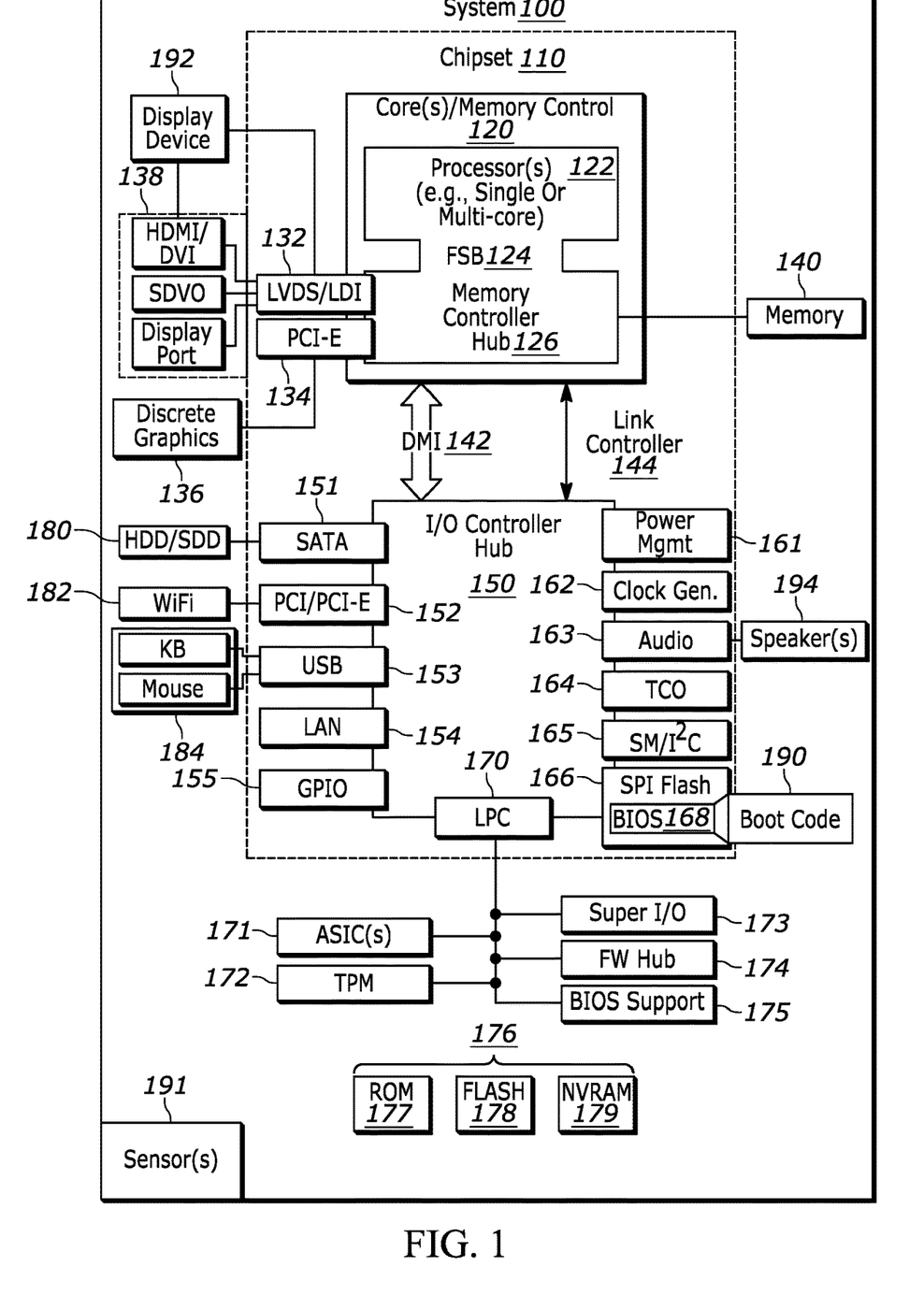
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include one or more sensors 191. The sensors 191 may include, for example, one or more cameras that gather images and provide the images and related input to the processor 122. The camera(s) may be webcams and/or digital cameras, but may also be thermal imaging cameras, infrared (IR) cameras, three-dimensional (3D) cameras, and/or cameras otherwise integrated into the system 100 and controllable by the processor 122 to gather still images and/or video. Thus, for example, a camera might be on a headset being worn by a user so that the system 100 may execute computer vision and/or simultaneous localization and mapping (SLAM) using images from the camera consistent with present principles (e.g., for location tracking).

In addition to or in lieu of the foregoing, the sensors 191 may include one or more inertial measurement sensors that might be included in an inertial measurement unit (IMU) for location tracking (e.g., dead reckoning) and other purposes discussed below. For example, the system 100 may be embodied in a headset and the inertial measurement sensors may be located on the headset. Example inertial measurement sensors include magnetometers that sense and/or measure directional movement of the system 100 and provide related input to the processor 122, gyroscopes that sense and/or measure the orientation of the system 100 and provide related input to the processor 122, and accelerometers that sense acceleration and/or movement of the system 100 and provide related input to the processor 122.

Additionally, though not shown for simplicity, in some embodiments the system 100 may include an audio receiver/microphone that provides input from the microphone to the processor 122 based on audio that is detected, such as via a user providing audible input to the microphone as a voice command. The system 100 may also include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
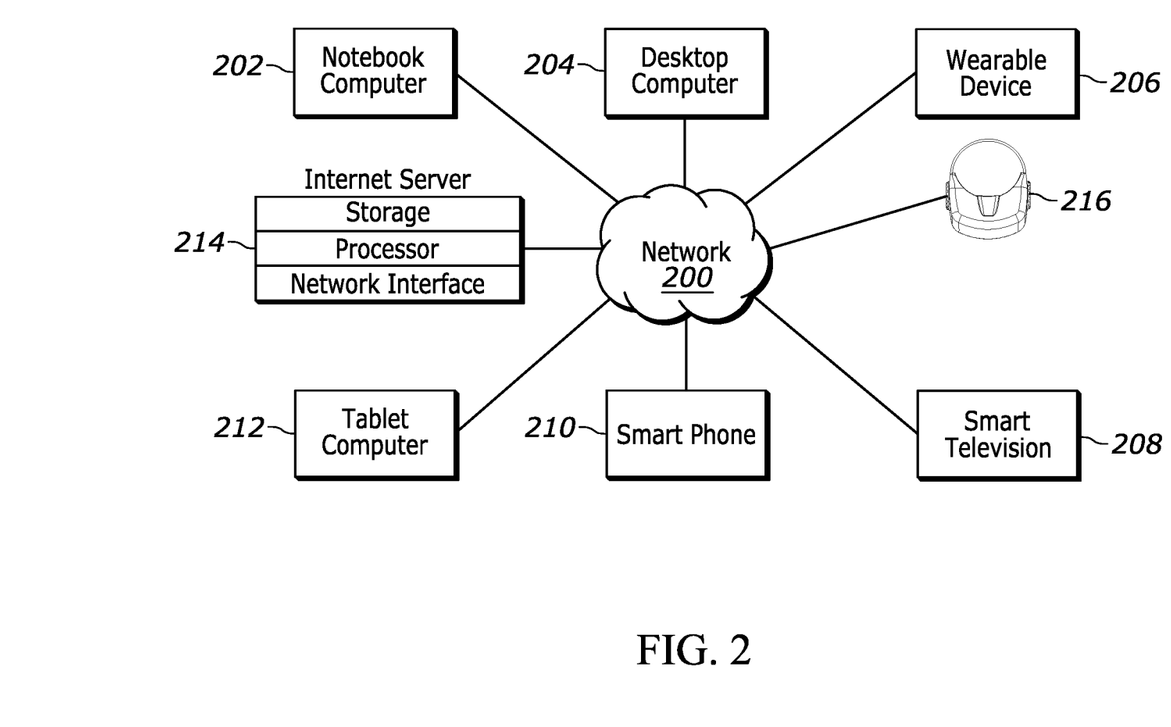
FIG. 2 is a block diagram of an example network of devices consistent with present principles.

Turning now to FIG. 2, example devices are shown communicating over a network 200 such as the Internet in accordance with present principles (e.g., for participating in a shared virtual environment). It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216 as well as host/generate AR, VR, and MR simulations consistent with present principles. It is to be understood that the devices 202-216 may be configured to communicate with each other over the network 200 to undertake present principles.

Figure 3:
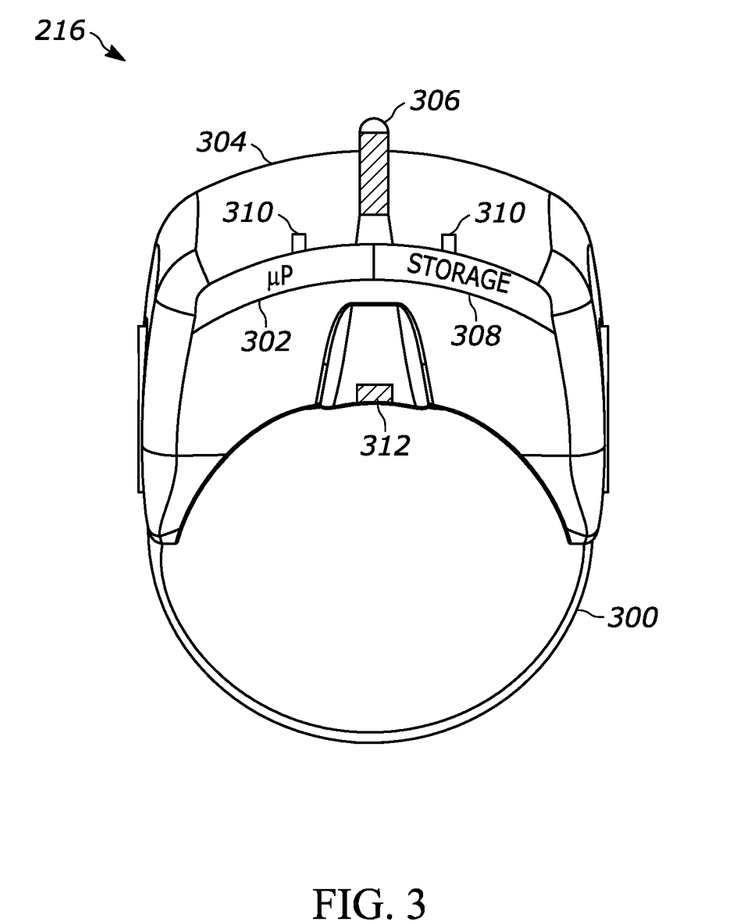
FIG. 3 illustrates an example headset that may be used to present an AR, MR, or VR presentation consistent with present principles.

Now describing FIG. 3, it shows a top plan view of an example headset consistent with present principles, such as the headset 216 referenced above. The headset 216 may include a housing 300, at least one processor 302 in the housing 300, and a non-transparent or transparent "heads up" display 304 accessible to the at least one processor 302 and coupled to the housing 300. The display 304 may for example have discrete left and right eye pieces as shown for presentation of stereoscopic images and/or 3D virtual images/objects using augmented reality (AR) software, virtual reality (VR) software, and/or mixed reality (MR) software.

The headset 216 may also include one or more forward-facing cameras 306. As shown, the camera 306 may be mounted on a bridge portion of the display 304 above where the user's nose would be so that it may have an outward-facing field of view similar to that of the user himself or herself while wearing the headset 216. The camera 306 may be used for SLAM, computer vision, image registration, spatial mapping, etc. to track movements of the wearer/headset 216 within real-world space and map the movements to virtual space. The camera 306 may also be used to identify the orientation of another device and other live physical attributes as described herein (e.g., using computer vision, object recognition, and other image processing techniques). Also note that the camera(s) 306 may be located at other headset locations as well.

Additionally, in some examples inward-facing cameras 310 may also be mounted within the headset 216 and oriented to image the user's eyes for eye tracking while the user wears the headset 216.

Still further, the headset 316 may include storage 308 accessible to the processor 302 and coupled to the housing 300, a microphone 312 for detecting audio of the user speaking voice commands, and still other components not shown for simplicity such as a network interface for communicating over a network such as the Internet and a battery for powering components of the headset 216 such as the camera(s) 306. Additionally, note that while the headset 216 is illustrated as a head-circumscribing VR headset, it may also be established by computerized smart glasses or another type of headset including other types of AR and MR headsets. For example, the headset may be established by an AR headset that may have a transparent display that is able to present 3D virtual objects/content. The headset's display may therefore be transparent for AR and MR applications, or may be non-transparent for VR applications or AR/MR applications where a camera feed of the user's forward-facing field of view (FOV) of his/her real-world surroundings is presented on the non-transparent display along with virtual objects.

Also note here that while FIG. 3 shows a headset, handsets such as smartphones and tablet computers may also be used for AR, MR, and VR applications as discussed herein to present virtual objects and environments on the handset's display. Further note that laptops and other types of computing devices may also be used.

Figure 4:
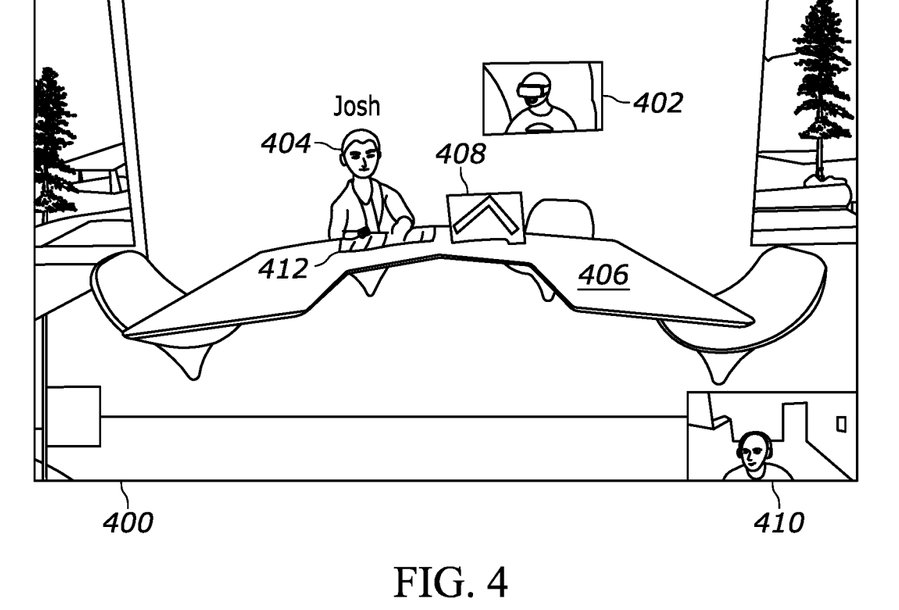
FIG. 4 shows example virtual space in which live physical attributes of a real-world device are represented via a virtual representation of the device itself consistent with present principles.

Now in reference to FIG. 4, suppose an end-user 402 is wearing a headset like the headset 216 to engage in a computer-generated VR experience/presentation 400 in the metaverse. The user 402 might be doing so to virtually interact with another person 410 in virtual space as established by the VR presentation 400. A representation 404 of the other person 410 is therefore shown in virtual space, with the user 402 and person 410 possibly being remotely-located from each other by miles or more in real space. But owing to the virtual presentation 400, they are both placed into the same virtual space together, which in this case is a virtual conference room as shown. Also note that according to FIG. 4, the current field of view (FOV) shown of the presentation 400 is from the virtual perspective of the user 402 while in virtual space, and as such the perspective of the presentation 400 may change as the user 402 moves around the virtual space itself (e.g., possibly as mapped to real-world movements of the user as identified using input from a camera in the user's real world environment and execution of computer vision).

As also shown in FIG. 4, the virtual conference room may include a computer-generated virtual conference table 406. Virtually presented on the table 406 may be a representation 408 of a convertible laptop computer, with the representation 408 being a graphical object presented according to one or more real-world live physical attributes of that device. In various examples, the live physical attributes can relate to real-world position and orientation of the laptop computer relative to its real-world person 410, and its real-world position and orientation relative to a real-world surface on which it has been placed. The live physical attributes may also relate to positioning and/or movement of different parts of the laptop with respect to each other.

For example, as reflected in the virtual representation 408, the laptop has been placed in a tent mode where, when placed on an actual real-world surface, the laptop's two panels form an upside down "V". As such, the laptop's real-world display on one of the panels faces outward and toward the user 410 according to its current real world orientation so the user 410 can view content presented on the real-world display while the laptop is in the tent mode configuration.

Accordingly, this live/current configuration (and the live physical attributes of real-world position/direction/distance from the user) may be represented in the corresponding virtual representation 408 in virtual space and as seen by the user 402 and person 410 from their own respective virtual FOVs while both of the people 402, 410 are immersed within virtual space. Thus, the virtual representation 408 of the laptop in virtual space is presented in tent mode with its virtual display facing toward the representation 408 of the person 410 (and at a virtual distance and virtual direction in virtual space that is the same as or similar to the real-world distance and direction to the person 510 in real space) to mimic real-world positioning and orientation of the real-world laptop with respect to the real-world user 410 in real space. And owing to the virtual FOV of the user 402 facing the representation 404 of the user 410 as shown, the user 402 sees a side view of the representation 408.

Further note that if the user 410 where to move the real-world laptop panels with respect to each other in the real world, such as to change from tent mode to another mode like stand mode or tablet mode, the corresponding virtual panels of the representation 408 may move in real time in virtual space as the real panels move in real space. The virtual panels may also be oriented toward the user representation 404 in virtual space just as the corresponding real panels are oriented toward the user 410 in real space as they move.

As also shown in FIG. 4, also virtually presented in virtual space, on the table 406 specifically, may be a representation 412 of a real-world wireless Bluetooth keyboard being used by the user 410. Thus, here too the representation 412 may be presented in virtual space according to one or more real-world live physical attributes of the corresponding real world keyboard represented by the representation 412. For example, light emitting diode (LED) backlighting under keys of the real-world keyboard may be one or more real-world colors according to user preference, and so the virtual backlighting of respective virtual keys of the virtual keyboard 412 may be presented in the same/similar colors. As another example, should the user 410 press a certain real key of the real keyboard, the same key on the virtual keyboard 412 may move down and up in real time in virtual space as the corresponding real key moves down and up in real space.

Figure 5:
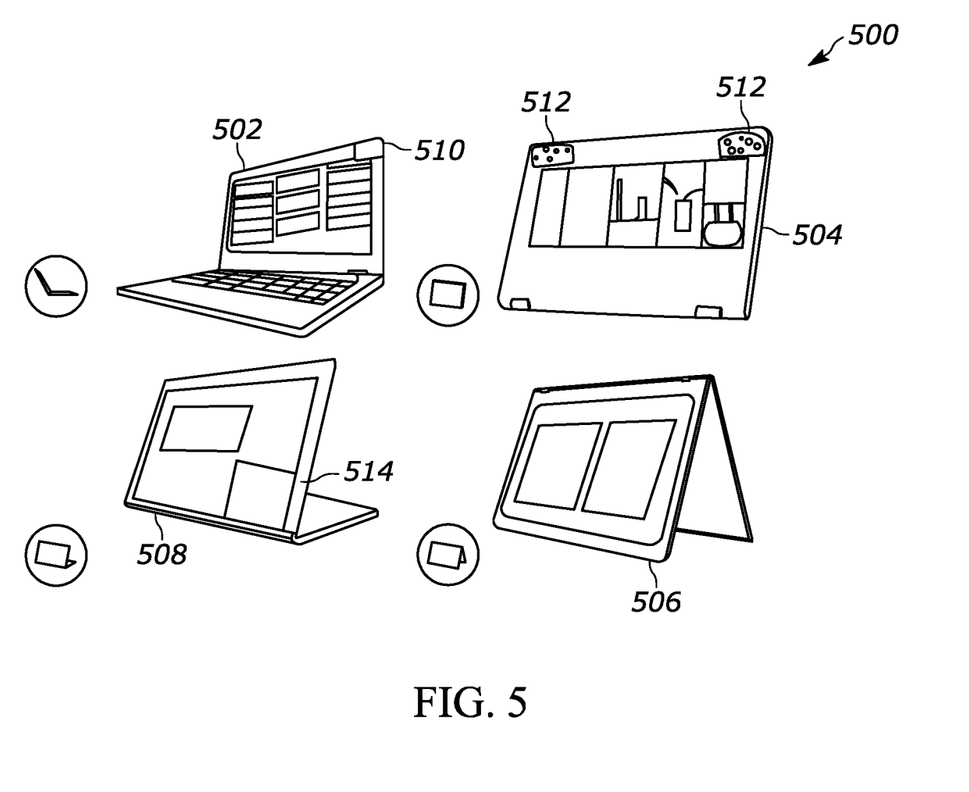
FIG. 5 shows perspective views of various example physical configurations of a laptop/convertible computer that may be represented in virtual space consistent with present principles.

Continuing the detailed description in reference to FIG. 5, it shows various example configurations 502, 504, 508, and 510 of a convertible laptop computer 500, with the configurations 502-510 establishing live physical attributes in various examples. According to configuration 502, the computer 500 has been placed into a laptop mode where the bottom panel with keyboard is placed face up on a surface such as a desk and the plane of the upper panel with display is oriented obliquely and/or perpendicularly with respect to the plane of the lower panel.

According to configuration 504, the computer 500 has been placed in tablet mode where the panels have been rotated about the hinge of the computer 500 so that the upper and lower panels are back-to-back with the display and keyboard facing outward away from each other in opposite directions.

Then according to configuration 508, the computer 500 has been placed in stand or presentation mode where the upper and lower panels have been rotated about the hinge so that the lower panel rests on a surface with the keyboard side face down and so that the upper panel with display is oriented obliquely and/or perpendicularly with respect to the plane of the lower panel so that the display still faces outward for content viewing. Then for the configuration 506, the same general, relative positioning of the upper and lower panels with respect to each other may be maintained but the orientation of the computer 500 may be rotated so that the outer longitudinal edges of the upper and lower panels rest on a surface to establish a tent mode or upside down "V" similar to as described above in reference to FIG. 4. Thus, while in the tent mode the keyboard and display both face outward away from the computer 500 at oblique angles with respect to the surface.

Further describing the computer 500, as shown according to configuration 504, one or more portions of the computer 500 (such as the display side of the upper panel as shown) may include one or more infrared (IR) light reflectors 512 for an IR transceiver and/or IR camera to identify the configuration and/or orientation of the device based on the known locations of the IR light reflectors 512. Thus, the configuration and/or orientation may be identified via the reflectors 512 using computer vision using a camera located elsewhere within the environment.

Additionally or alternatively, as shown for configuration 502, the computer 500 may include one or more IR light emitters/strobes 510 positioned at various known locations on the computer 500 so computer vision may similarly be executed to identify the configuration/orientation of the computer 500 based on the positioning of the strobes 510.

As but one more example, as shown according to configuration 508, one or more quick response (QR) codes 514 may be placed on stickers located at known locations about the housing of the computer 500, and/or may even be graphically presented at a designated location on the display of the computer 500, for the other device having the camera located elsewhere in the environment to identify the configuration/orientation of the computer 500 based on the view/location of the QR code 514. Furthermore, in some examples the QR code may even point to a website or other electronic storage where a computer aided design (CAD) file or other 3D rendering data for the computer 500 itself may be accessed (based on the other device scanning the QR code using its camera to identify the website URL or other storage location address). Thus, the live physical attributes of device orientation/mode configuration may be determined based on the locations and orientations of the components 510, 512, and/or 514.

Figure 6:
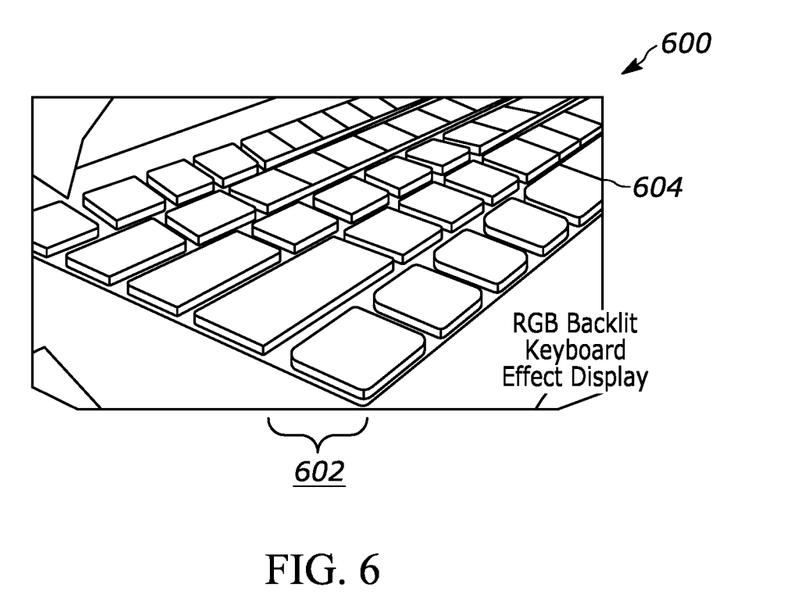
FIG. 6 shows a perspective view of a keyboard with light-emitting diode (LED) backlighting of various colors that can be represented in virtual space consistent with present principles.

Now in reference to FIG. 6, an example perspective view of a real-world keyboard 600 is shown. Though not clear from FIG. 6 owing to the black and white drawings, it is to be understood that at least the first and second columns of keys of the keyboard 600 (including control key 602) are backlit in a purple color via LEDs under the respective keys. Remaining keys (including space bar key 604) are understood to be backlit in a green color via LEDs under those respective keys. Thus, the live physical attributes of the backlighting of each key may be similarly represented on a virtual keyboard in virtual space that represents the keyboard 600. For example, the same respective keys of the virtual keyboard 412 may be backlit in the same colors according to the respective lighting conditions of the respective real-world keys of the keyboard 600 itself.

Figure 7:
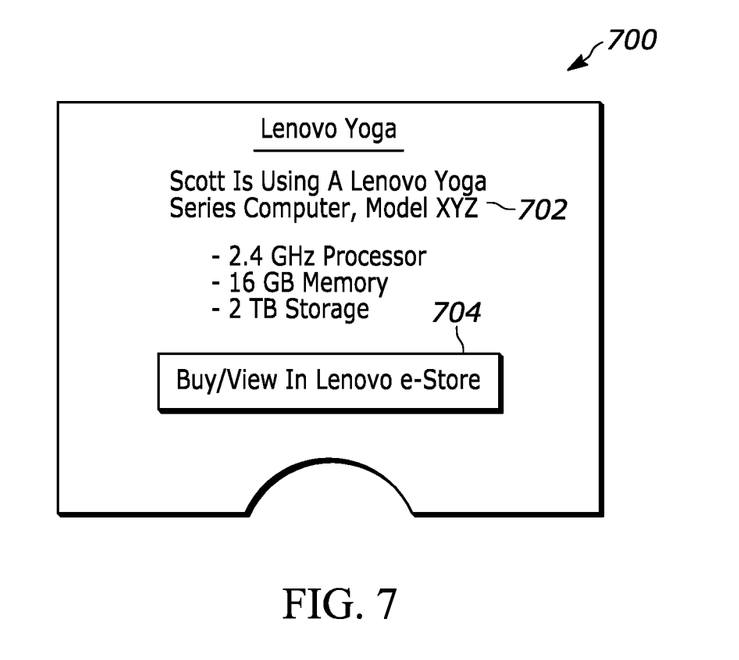
FIGS. 7 and 8 show respective graphical user interfaces (GUIs) that may be presented responsive to another person selecting a representation in virtual space of a real-world device consistent with present principles.

Now in reference to FIG. 7, suppose according to the example of FIG. 4 that while within the virtual conference room with each other, the user 402 controls his virtual representation to reach out and virtually touch the representation/virtual device 408 of the user 410 with a virtual hand. This may be identified by the device facilitating the virtual presentation as input selecting the representation 408 in virtual space. Thus, responsive to the input, the headset display of the user 402 may present, in virtual space, data related to the real-world device represented by the representation 408. For example, the data may include technical specifications related to the device and information on where to buy a similar device (e.g., same make and model).

FIG. 7 illustrates the presentation of this data. As shown, a window/graphical user interface (GUI) 702 may be overlaid at the headset display on top of the user's view of the virtual environment. Data 702 indicates the name of the user 410 and indicates metadata such as the make, series, and model of computer represented by the representation 408. The data 702 may also indicate real-world technical specs for the real-world computer, including that the computer includes a 2.4 GHz processor, 16 gigabytes of memory/RAM, and 2 terabytes of internal persistent storage such as solid state drive storage or hard disc drive storage.

As also shown in FIG. 7, in some examples the GUI 700 may indicate where to buy a similar device. For example, the GUI 700 may include a selector 704 with text indicating that a similar device can be bought or viewed in the electronic store of the device manufacturer. The selector 704 may even be selectable via touch input, voice input, eye input, etc. to command the user's device to then navigate to a linked website uniform resource locator (URL) for a web page displaying the same computer make/series/model for sale so that the user 702 may buy a similar computer direct from the manufacturer.

Figure 8:
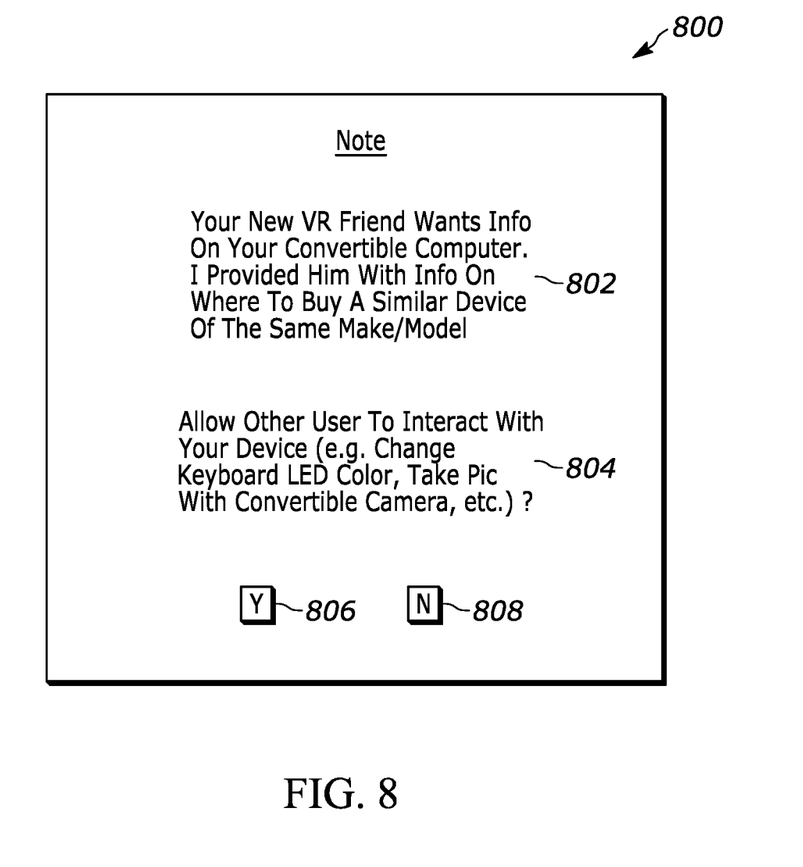

Also note that responsive to the user 402 virtually selecting the representation 408 to present the GUI 700 on his/her headset display, an electronic notification may be sent to the other headset of the other person 410 for presentation on its own display as a GUI 800 as shown in FIG. 8. The GUI 800 may therefore include an indication 802 to the user 410 that the user 402 wanted information on the computer represented by representation 408 and that the system/VR simulator provided the information.

Additionally, further note that in some circumstances, the user 402 may not only reach out with a virtual hand (e.g., that tracks real hand motion) to virtually touch the representation 408 in virtual space in order to be presented with the GUI 700, but may also be afforded the ability to virtually interact with the representation 408 itself to affect real-world action at the corresponding real-world computer itself that is represented by the representation 408 in virtual space. Thus, the GUI 800 may also include a prompt 804 prompting the person 410 whether the person 410 would like to allow the user 402 to virtually interact with the computer represented by the representation 408 in order to control the corresponding computer itself in the real world. For example, as shown the prompt 804 may indicate that selection of the "yes" selector 806 may permit the user 402 to change the real-world backlighting colors of the real-world keyboard of the corresponding computer and to take/generate a real-world photograph using the computer's real-world camera according to the current real-world field of view of the real-world camera. However, if the user 410 does not wish to provide such control to the user 402, the user 410 may instead select the "no" selector 808 to decline to give such permissions to the user 402.

Figure 9:
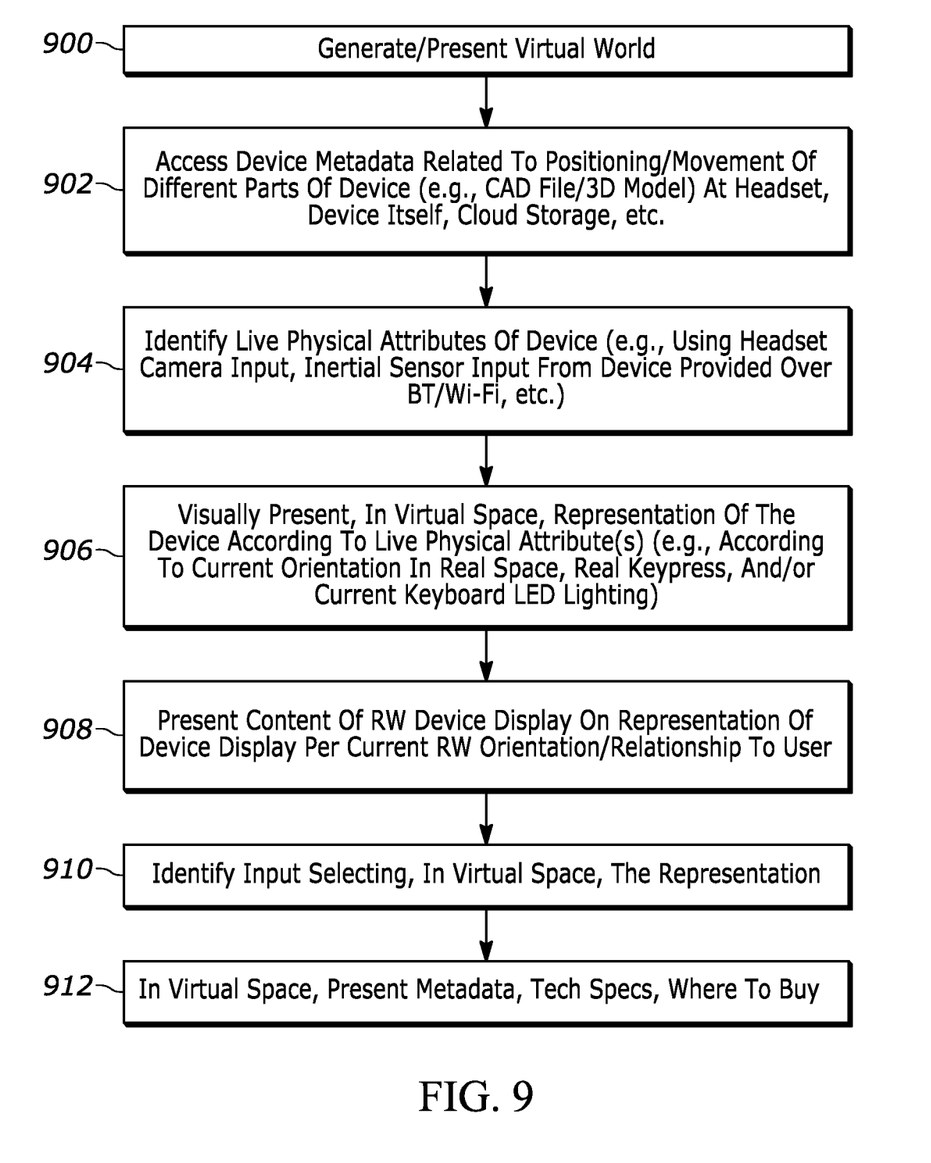
FIG. 9 illustrates example logic in example flow chart format that may be executed by a device consistent with present principles.

Referring now to FIG. 9, it shows example overall logic consistent with present principles that may be executed by a device such as the system 100, an end-user device such as a smartphone or AR/VR headset, and/or a remotely-located coordinating server in any appropriate combination. For example, the logic of FIG. 9 may be executed jointly or by one of a smartphone and server that are communicating to present a metaverse experience to or otherwise generate a virtual space for the users 402, 410 so that those people can virtually interact with each other in the same virtual space. Also note that while the logic of FIG. 9 is shown in flow chart format, other suitable logic may also be used.

Beginning at block 900, the device may generate and present a virtual environment, such as the virtual conference room described above in reference to FIG. 4. The logic may then proceed to block 902. At block 902 the device may access metadata related to the positioning and/or movement of different parts of a computer with respect to each other, where the computer may be a real-world computer used by one of the real-world participants and that is also virtually represented in the virtual environment itself. The metadata may be accessed from any suitable predetermined storage location, such as local storage of the AR/VR headset paired with the computer itself (and that is being used by the corresponding user to view the virtual presentation). Additionally or alternatively, the metadata may be accessed from local storage on the subject computer itself or even from cloud/server storage for the associated user/computer. The metadata itself may take various forms, such as a 3D model of the device itself including but not limited to a computer aided design (CAD) file specifically.

From block 902 the logic may then proceed to block 904. At block 904 the device may identify one or more live physical attributes of the computer, such as which mode and orientation the computer has been placed in according to the description of FIG. 5 above. Other live physical attributes of the real-world computer may also be identified, such as LED backlighting color for the computer's keyboard as well as actual user keypresses of keys on the keyboard as they occur in real time (and, in some examples, the LED backlighting color change as might occur responsive to the keypress itself).

The live physical attributes may be identified any number of ways, including some already set forth above. For example, a real-world camera on the headset that is paired with the computer or a real-world camera that is located elsewhere within the real world may be used to identify the attributes. E.g., device mode/orientation may be identified from the positioning of different parts of a convertible computer with respect to each other as determined using computer vision, and/or identified from the predetermined positions and orientations of the IR light strobe 510, IR light reflectors 512, and/or QR code 514 on the computer as also determined using computer vision.

The real-world camera may also be used to identify other live physical attributes as well, such as a real keypress of a real key on a real keyboard of the computer as identified using computer vision, object recognition to identify the key, and/or action recognition to identify the keypress gesture. This may be used to ultimately show, as part of the virtual representation of the same computer in virtual space, a virtual keypress of a corresponding virtual key on a virtual keyboard of the computer within virtual space.

Additionally or alternatively, the live physical attributes of device orientation, mode, and movement may be identified based on input from inertial sensors in the computer itself, such as a gyroscope and accelerometer. E.g., input from inertial measurement sensors in each movable part of the convertible computer may be used (e.g., a gyroscope and accelerometer in each panel of the convertible computer). The inertial sensor inputs may then be transmitted to the device(s) executing the logic of FIG. 9 via Bluetooth communication with the computer, Wi-Fi communication with the computer, wireless 5G cellular communication with the computer, etc. for processing to determine mode, movement, and orientation.

From block 904 the logic may proceed to block 906. At block 906 the device may visually present, in virtual space, a representation of the computer as described herein so that the representation is presented according to the identified live physical attribute(s) of the computer. Thus, to reiterate, the representation may be visually presented to represent the computer's current real-world orientation in real space, to represent a real-world keypress in real space, and/or to represent real-world LED backlighting for the real-world keyboard of the computer.

Still further, if desired in some examples the logic may move to block 908 where the device may also present the visual content of the real-world computer's display on the virtual display of the representation of the computer within virtual space so that the same real time content is reflected on both the real-world display in real space and the virtual display in virtual space. Also note that by using stereoscopic images generated using AR or VR software, the visual content may be virtually presented on the virtual display in 3D according to the computer's current virtual orientation and virtual position with respect to the viewing user (e.g., to thus match the current real-world orientation of the computer and potentially real-world position with respect to the viewing user). Thus, the virtual spatial relationship to the viewing user within virtual space may match the real-world spatial relationship to the viewing user within real space if the two are located in the same real world space (e.g., represent in virtual space the same distance/direction between the two in the real world). Thus, the virtual display of the virtual representation of the computer may act as a screen share where the content presented on the real-world computer is shown to others within virtual space via the virtual display of the virtual representation of the same computer. This content may include app windows, a desktop screen, etc. as currently presented on the real-world display.

From block 908 the logic may then proceed to block 910. At block 910 the device may identify input selecting, in virtual space, the representation of the computer. The input may be input from another person interacting within the virtual space to view device metadata and other information such as technical specs and where to purchase a similar device as described above. Thereafter, the logic may proceed to block 912 where the device may present the metadata/information in virtual space to the respective person that provided the input identified at block 910.

Figure 10:
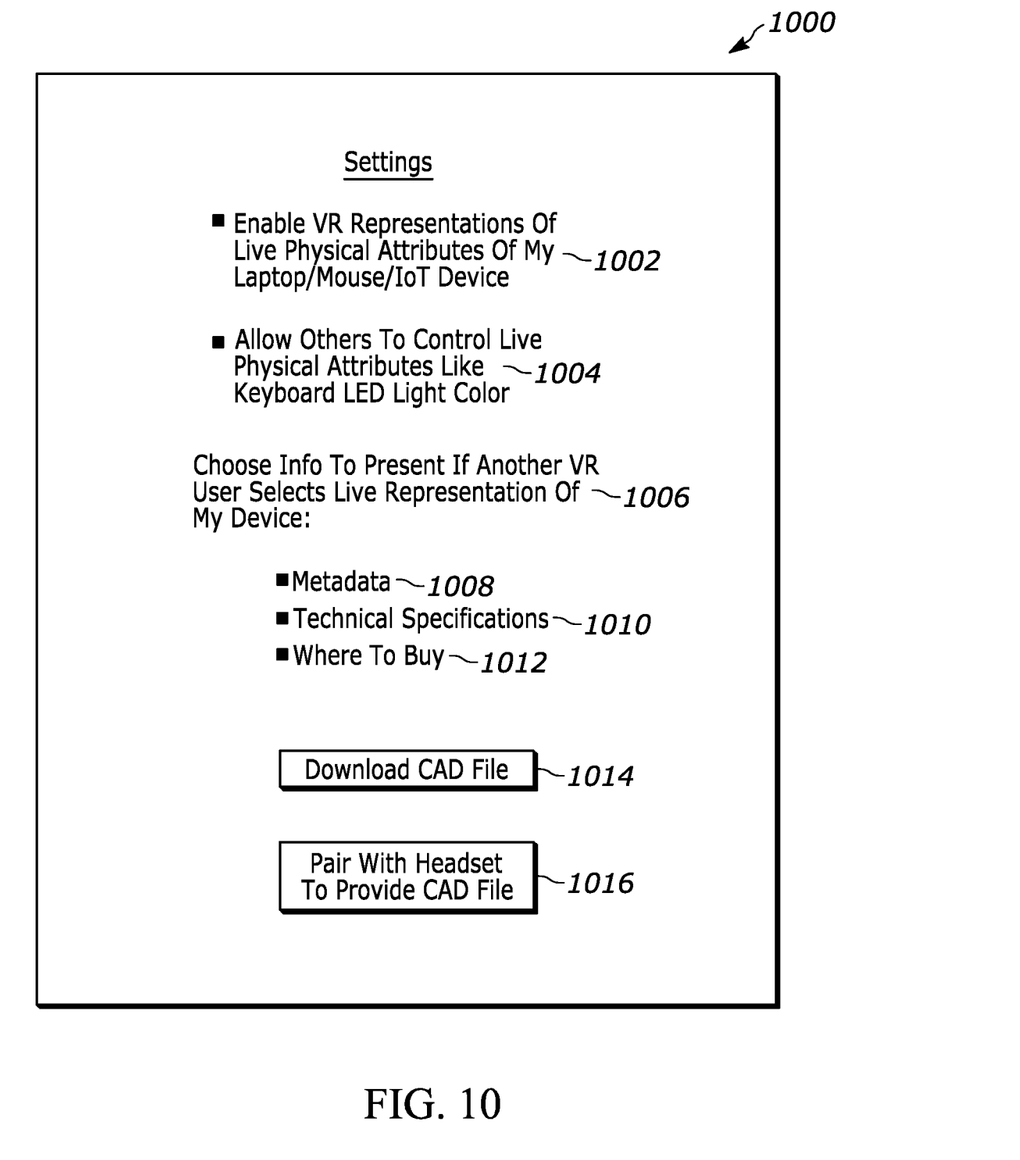
FIG. 10 shows an example settings GUI that may be presented on a display to configure one or more settings of a device to operate consistent with present principles.

Now in reference to FIG. 10, an example GUI 1000 consistent with present principles is shown that may be presented on the display of a computer/client device to configure/enable one or more settings related to AR/VR/MR presentations as described herein. The settings GUI 1000 may be reached by navigating a settings menu of the device or a dedicated app menu for a given VR/AR/MR simulator, for example. Also note that in the example shown, each option discussed below may be selected by directing touch or cursor or other input to the respective check box adjacent to the respective option.

As shown in FIG. 10, the GUI 1000 may include an option 1002 that may be selectable a single time to set or configure the device/system to undertake present principles to identify live physical attributes of devices and then visually present representations of the devices in virtual space according to the live physical attributes. For example, selection of the option 1002 may configure the device to execute the logic of FIG. 9 as well as to execute the other actions described above in reference to FIGS. 5-8 in multiple future virtual environment presentation instances over time. Additionally, note per FIG. 10 that devices for which live physical attributes may be identified and represented in virtual space include not just laptop computers but other types of computers and input devices as well, such as smartphones, wearable devices, kids' electronic devices, other AR/VR headsets, mice, keyboards, speakers, Internet of things (IoT) devices, etc. E.g., the movement of a real-world scroll wheel of a mouse may be represented in virtual space using a virtual representation of the mouse and scroll wheel so that the virtual scroll wheel mimics the actual speed and direction of the corresponding real-world scroll wheel.

As also shown in FIG. 10, the GUI 1000 may include an option 1004 to specifically set the device to enable the computer for which live physical attributes will be represented to be controllable by others within virtual space besides the owner/user themselves. For example, per the description above another person may be permitted to control the real-world camera of the associated computer or the backlighting color for the real-world keyboard of the associated computer.

In some examples, the GUI 1000 may also include a setting 1006 at which an end-user may choose one or more options 1008-1012 for different types of information to present in virtual space to another person when that other person interacts with the virtual representation of the associated computer as described herein. Thus, option 1008 may be selected to set or enable the device/system to present metadata, option 1010 may be selected to set or enable the device/system to present technical specifications, and options 1012 may be selected to present information on where to buy a similar computer.

As also shown in FIG. 10, in some examples the GUI 1000 may include a selector 1014. The selector 1014 may be selectable to initiate a download from an Internet-based server or other device of a CAD file or other 3D model related to the computer that is to be represented in virtual space so that the CAD file may be used to represent orientation, movement, etc. of the computer in virtual space as described above. If desired, the GUI 1000 may even include a selector 1016 that may be selectable to initiate a pairing process where a headset that will be used to present the virtual environment may be paired with the downloading device for the downloading device to wirelessly control the headset to provide the downloaded CAD file for local storage at the headset.

It may now be appreciated that present principles provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
at least one processor; and
storage accessible to the at least one processor and comprising instructions executable by the at least one processor to:
identify a live physical attribute of a device, the live physical attribute related to content presented on a real-world display of the device;
based on the identification, visually present, in virtual space, the content on a virtual display of a representation of the device;
receive input from a first person to select, in the virtual space, the representation; and
responsive to receipt of the input from the first person, present, on the real-world display, a notification that the first person is attempting to interact with the device in the virtual space.

2. The apparatus of claim 1, wherein the device is established by a headset, and wherein the apparatus comprises the headset.

3. The apparatus of claim 1, wherein the instructions are executable to:
visually present the content on the virtual display according to metadata that is stored in storage of a virtual reality (VR) device, the metadata being embedded in the VR device.

4. The apparatus of claim 3, wherein the metadata is embedded in the VR device's firmware and/or driver as transmitted and stored in the VR device during a pairing process.

5. The apparatus of claim 1, wherein the instructions are executable to:
identify input from a second person to grant permission to the first person to interact with the device in the virtual space; and
based on identification of the input from the second person to grant permission to the first person to interact with the device in the virtual space, allow the first person to interact with the device in the virtual space.

6. The apparatus of claim 5, wherein the first person is allowed to interact with the device in the virtual space by acting in the virtual space to change one or more real-world backlighting colors of the device's real-world keyboard.

7. The apparatus of claim 1, wherein the live physical attribute is also established by a particular color of light from one or more light emitting diodes (LEDs) on a real-world keyboard of the device, the representation presented to show the same particular color of light on a virtual keyboard in the virtual space.

8. A method, comprising:
identifying a live physical attribute of a device;
visually presenting, in virtual space, a representation of the device, the representation presented according to the live physical attribute of the device, the live physical attribute established at least in part by a particular piece of content presented on a real-world display of the device;
receiving input from a first person to select, in the virtual space, the representation; and
responsive to receipt of the input from the first person, presenting, on the real-world display, a notification that the first person is attempting to interact with the device in the virtual space.

9. The method of claim 8, wherein the live physical attribute is identified based on one or more of: Bluetooth communication with the device to communicate the particular piece of content, Wi-Fi communication with the device to communicate the particular piece of content.

10. The method of claim 8, wherein the live physical attribute is also established by a particular color of light from one or more light emitting diodes (LEDs) on a real-world keyboard of the device, the representation presented to show the same particular color of light on a virtual keyboard in the virtual space.

11. The method of claim 8, wherein the live physical attribute is established at least in part by a real keypress of a real key on a real keyboard of the device, the method further comprising:
presenting a representation, in the virtual space, of the real keypress by showing a real-time down and then up movement of a virtual key on a virtual keyboard shown in the virtual space.

12. The method of claim 8, comprising:
identifying input from a second person to grant permission to the first person to interact with the device in the virtual space; and
based on identification of the input from the second person to grant permission to the first person to interact with the device in the virtual space, allowing the first person to interact with the device in the virtual space.

13. The method of claim 12, wherein the first person is allowed to interact with the device in the virtual space by acting in the virtual space to change one or more real-world backlighting colors of the device's real-world keyboard.

14. An apparatus, comprising:
- at least one computer readable storage medium (CRSM) that is not a transitory signal, the at least one CRSM comprising instructions executable by at least one processor to:
- visually present, in virtual space, a representation of a device, the representation presented according to a live physical attribute of the device, the representation showing a screen share of one or more graphical objects that are currently presented on a real-world display of the device;
- identify input from a first person to select, in the virtual space, the representation; and
- responsive to identification of the input from the first person, present, on the real-world display, a notification that the first person is attempting to interact with the device in the virtual space.

15. The apparatus of claim 14, wherein the instructions are executable to:
- receive input from a second person to grant permission to the first person to interact with the device in the virtual space; and
- based on receipt of the input from the second person to grant permission to the first person to interact with the device in the virtual space, allow the first person to interact with the device in the virtual space.

16. The apparatus of claim 15, wherein the first person is allowed to interact with the device in the virtual space by acting in the virtual space to change one or more real-world backlighting colors of the device's real-world keyboard.

17. The apparatus of claim 14, wherein the live physical attribute is also established by a particular color of light from one or more light emitting diodes (LEDs) on a real-world keyboard of the device, the representation presented to show the same particular color of light on a virtual keyboard in the virtual space.

18. The apparatus of claim 14, comprising the at least one processor.

19. The apparatus of claim 14, comprising the device.

20. The apparatus of claim 19, wherein the device is a first device, and wherein the apparatus comprises both the first device and a second device associated with the first person, the first and second devices both configured to present the virtual space.

* * * * *